United States Patent
Eguchi et al.

(10) Patent No.: US 8,053,932 B2
(45) Date of Patent: Nov. 8, 2011

(54) CONNECTION APPARATUS FOR PARALLEL RUNNING GENERATORS

(75) Inventors: Junichi Eguchi, Saitama (JP); Ryuichi Kimata, Saitama (JP); Minoru Tamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 302 days.

(21) Appl. No.: 12/489,093

(22) Filed: Jun. 22, 2009

(65) Prior Publication Data

US 2009/0319089 A1 Dec. 24, 2009

(30) Foreign Application Priority Data

Jun. 24, 2008 (JP) ................................. 2008-164371

(51) Int. Cl.
*H02J 3/04* (2006.01)

(52) U.S. Cl. ........................................................ 307/84

(58) Field of Classification Search ................... 307/84, 307/43
See application file for complete search history.

(56) References Cited

U.S. PATENT DOCUMENTS

| 4,829,228 A * | 5/1989 | Buetemeister ................. 322/27 |
| 5,612,579 A * | 3/1997 | Wisbey et al. .................. 307/18 |
| 6,297,977 B1 * | 10/2001 | Huggett et al. ................. 363/65 |
| 7,679,215 B2 * | 3/2010 | Delmerico et al. ............. 307/57 |

FOREIGN PATENT DOCUMENTS

JP 05-103421 4/1993

* cited by examiner

*Primary Examiner* — Albert W Paladini
(74) *Attorney, Agent, or Firm* — Arent Fox LLP

(57) ABSTRACT

An apparatus for connecting two generators to run in parallel including a conductive path that connects the generators to an electrical load, a switching circuit that opens/closes the conductive path, a current sensor that detects current flowing the conductive path and an electronic control unit comprising a microcomputer. The control unit functions as a generator model identifier that inputs a signal indicating a model ID from each generator and determines whether the model ID corresponds to data stored in memory, and a switching circuit operator that operates the circuit to close the conductive path to connect the generators to the electrical load when the model ID corresponds to the data, while operates it to open the conductive path when the current is not detected by the current sensor after the conductive path was closed, thereby preventing the outputs of other generators from appearing at the terminals of a disconnected plug and damage to the generators.

4 Claims, 5 Drawing Sheets

CONNECTION APPARATUS FOR PARALLEL RUNNING GENERATORS

BACKGROUND OF THE INVENTION

1. Field of the Invention

This invention relates to a connection apparatus for parallel running generators, particularly to an apparatus for connecting generators to run in parallel.

2. Description of the Related Art

When a plurality of, e.g. two, generators are run or operated in parallel, a problem is encountered that if a plug connected with one of the generators disconnects, the output of the other generator appears at the terminals (blades) of the disconnected plug. To cope with this problem, it has been the practice to pre-equip the generators with dedicated parallel running sockets provided with insulating covers and to interconnect the sockets by means of a dedicated cable during parallel running.

Further, as taught by Japanese Patent No. 2,869,905, it is also known to deal with this problem by providing the apparatus having two plugs connectable with sockets of the two generators and one output socket connectable to the electrical load and by responding to disconnection of one of the plugs by breaking the connection between its ground terminal and a dedicated ground terminal so as to turn off the switch of a downstream relay, thereby preventing the output of the other generator from appearing at the terminals (blades) of the disconnected plug.

SUMMARY OF THE INVENTION

In the conventional practice of running generators in parallel, pre-equipping the generators with the dedicated parallel running sockets protected with insulating covers complicates the structure and is disadvantageous from the viewpoint of general utility. The arrangement taught by U.S. Pat. No. 2,869,905 is liable to experience the same drawbacks owing to the need to provide the dedicated ground terminal and so on. Moreover, the two generators remain in parallel running connection so long as no plug disconnection occurs, so that damage may occur if the outputs of the generators differ greatly.

An object of this invention is therefore to overcome the foregoing problems by providing a connection apparatus for parallel running generators which during parallel running of multiple interconnected generators is, without need for dedicated parallel running sockets or the like, responsive to disconnection of one plug to prevent the outputs of other generators from appearing at the terminals of the disconnected plug, and which further prevents damage to the generators.

In order to achieve the object, this invention provides an apparatus for connecting generators to run in parallel, comprising: a conductive path that is adapted to connect the generators to an electrical load; a switching circuit that opens/closes the conductive path; a current sensor that detects current flowing the conductive path; and an electronic control unit that comprises a microcomputer and functions as: a generator model identifier that inputs a signal indicating a model ID from each of the generators and determines whether the model ID of the inputted signal corresponds to data stored in memory; and a switching circuit operator that operates the switching circuit to close the conductive path to connect the generators to the electrical load when the model ID of the inputted signal corresponds to the data, while operates it to open the conductive path when the current is not detected by the current sensor after the conductive path was closed.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

Figure 1:
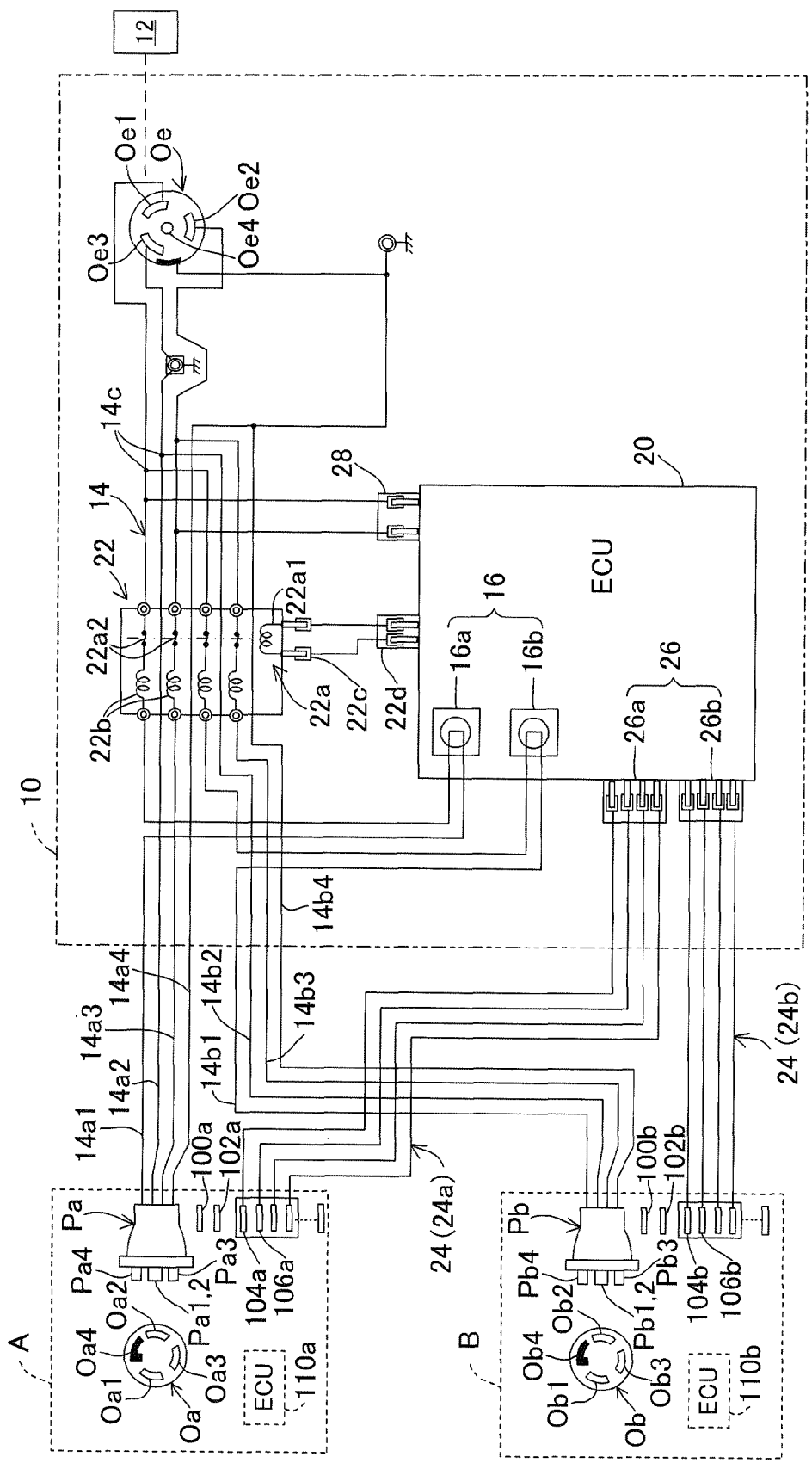
FIG. 1 is a block diagram giving an overview of a connection apparatus for parallel running generators according to an embodiment of this invention.

FIG. 1 is a block diagram giving an overview of a connection apparatus for parallel running generators according to an embodiment of this invention.

As illustrated, the connection apparatus (designated by reference numeral 10) is an apparatus for connecting a plurality of generators (two generators A and B in the illustrated configuration) for parallel running. The generators A and B are both driven by internal combustion engines started using recoil starters (not shown). The generators A and B are identical model units that, for example, produce single-phase alternating current outputs of around 4.5 kVA at 100 V/200 V.

The generators A and B are equipped with output sockets Oa and Ob for outputting power. The output socket Oa (Ob) is equipped with a single-phase, three-wire structure constituted of voltage terminals Oa1 and Oa2 (Ob1 and Ob2), and a neutral terminal Oa3 (Ob3) therebetween, plus a ground terminal Oa4 (Ob4).

The apparatus 10 is equipped with at least two plugs Pa and Pb connectable with the output sockets Oa and Ob of the generators A and B, respectively, at least one output socket Oe connectable to an electrical load 12, a conductive path 14 capable of connecting the generators A and B to the electrical load 12, current sensors 16 for detecting current flowing through the conductive path 14, an electronic control unit (ECU) 20 having a microcomputer, and a switching circuit 22 for opening and closing the conductive path 14. The ECU 20 is configured to be connectable through signal lines 24 (24*a* and 24*b*) and terminals 26 (26*a* and 26*b*) to terminals for accessing a troubleshooting facility of the generators A and B.

The foregoing components are explained below.

The plug Pa (Pb), which is configured complementary to the output socket Oa (Ob) of the generator A (B), is equipped with a single-phase, three-wire structure constituted of voltage terminals Pa1 and Pa2 (Pb1 and Pb2), and a neutral terminal Pa3 (Pb3) therebetween, plus a ground terminal Pa4 (Pb4). The plugs Pa and Pb and the output sockets Oa and Ob of the generators A and B have ordinary conventional structures.

Similarly to the output sockets Oa and Ob on the generator side, the output socket Oe of the apparatus 10 is equipped with a single-phase, three-wire structure constituted of voltage terminals Oe1 and Oe2, and a neutral terminal Oe3 therebetween, plus a ground terminal Oe4. The output socket Oe is connected to the electrical load 12 by inserting the plug (not shown) of the electrical load 12 into output socket Oe.

The conductive path 14 connects the plugs Pa and Pb with the output socket Oe. It is configured to receive the outputs of the generators A and B through the plugs Pa and Pb and send them to the electrical load 12 through the output socket Oe. Specifically, it comprises high-voltage wires 14a1 and 14b1 for interconnecting the voltage terminals on the high-voltage side, low-voltage wires 14a2 and 14b2 for interconnecting the voltage terminals on the low-voltage side, neutral wires 14a3 and 14b3 for interconnecting the neutral terminals, and ground wires 14a4 and 14b4 for interconnecting the ground terminals.

The high voltage wires 14a1 and 14b1, the low-voltage wires 14a2 and 14b2, the neutral wires 14a3 and 14b3, and the ground wires 14a4 and 14b4 are connected (merged) at junctions 14c, whereby the conductive path 14 is from thereon reduced to the high voltage wire 14a1, the low-voltage wire 14a2, the neutral wire 14a3, and the ground wire 14a4, so that the power outputs of the generators A and B are integrated and sent to the socket Oe thereby.

Current sensors 16a and 16b are connected (installed) in the conductive path 14, specifically in the high voltage wires 14a1 and 14b1 in the conductive path 14 on the upstream side of the switching circuit 22. The current sensors 16a and 16b produce outputs based on the current (cross current) flowing from one of the plugs Pa and Pb to the other thereof (detect presence/absence of current) and forward the outputs to the ECU 20.

The switching circuit 22 is inserted in the conductive path 14 on the upstream side of the junctions 14c. It is equipped with a relay 22a comprising a coil 22a1 and contacts 22a2 inserted in the high voltage wires 14a1 and 14b1 and the neutral wires 14a3 and 14b3. The contacts 22a2 of the relay 22a are normally closed. They remain closed to send the output of the generators A and B to the output socket Oe so long as the coil 22a1 is demagnetized.

When the coil 22a1 is magnetized, the contacts 22a2 open to open the conductive path 14. As a result, supply of the output of the generators A and B to the output socket Oe is prevented, and in the case where one of plugs disconnects, the output of the other generator is prevented from appearing at the disconnected plug. The contacts 22a2 can also be opened manually. The switching circuit 22 is provided upstream of the contacts 22a2 with coils 22b for detecting over-current. The coil 22a1 of the relay 22a of the switching circuit 22 is connected to the ECU 20 through connectors 22c and 22d.

The small double circles on opposite sides of the switching circuit 22 indicate terminals. A breaker (not shown) installed downstream of the switching circuit 22 opens the conductive path 14 when the electrical load 12 is overloaded owing to over-current or the like.

An operating power generation circuit (not shown) is provided between the high voltage wire 14a1, neutral wire 14a3 and terminals 28. The operating power generation circuit converts the AC 240 V voltage across the terminals of the high voltage wires 14a1 and 14b1 to 12 V and 5 V direct current for supply to the ECU 20 etc. as operating power.

The generators A and B are equipped with various terminals for troubleshooting, remote control and the like. Specifically, for troubleshooting and remote control there are provided TxD terminals 100a and 100b for transmission, RxD terminals 102a and 102b for reception, ground (GND) terminals 104a and 104b, and power supply (12 V) terminals 106a and 106b. The generators A and B are also provided with electronic control units (ECUs) 110a, 110b comprising microcomputers. (The suffixes a and b are omitted in the explanation that follows.)

The ECU 20 of the apparatus 10 can use the signal lines 24 and the terminals 26 to connect to the troubleshooting terminals, namely, the TxD terminals for transmission 100, RxD terminals 102 for reception, ground (GND) terminals 104, and power supply terminals 106. Owing to this configuration, the ECU 20 can communicate with the ECUs 110 of the generators A and B through the TxD terminals 100 and the RxD terminals 102.

Figure 2:
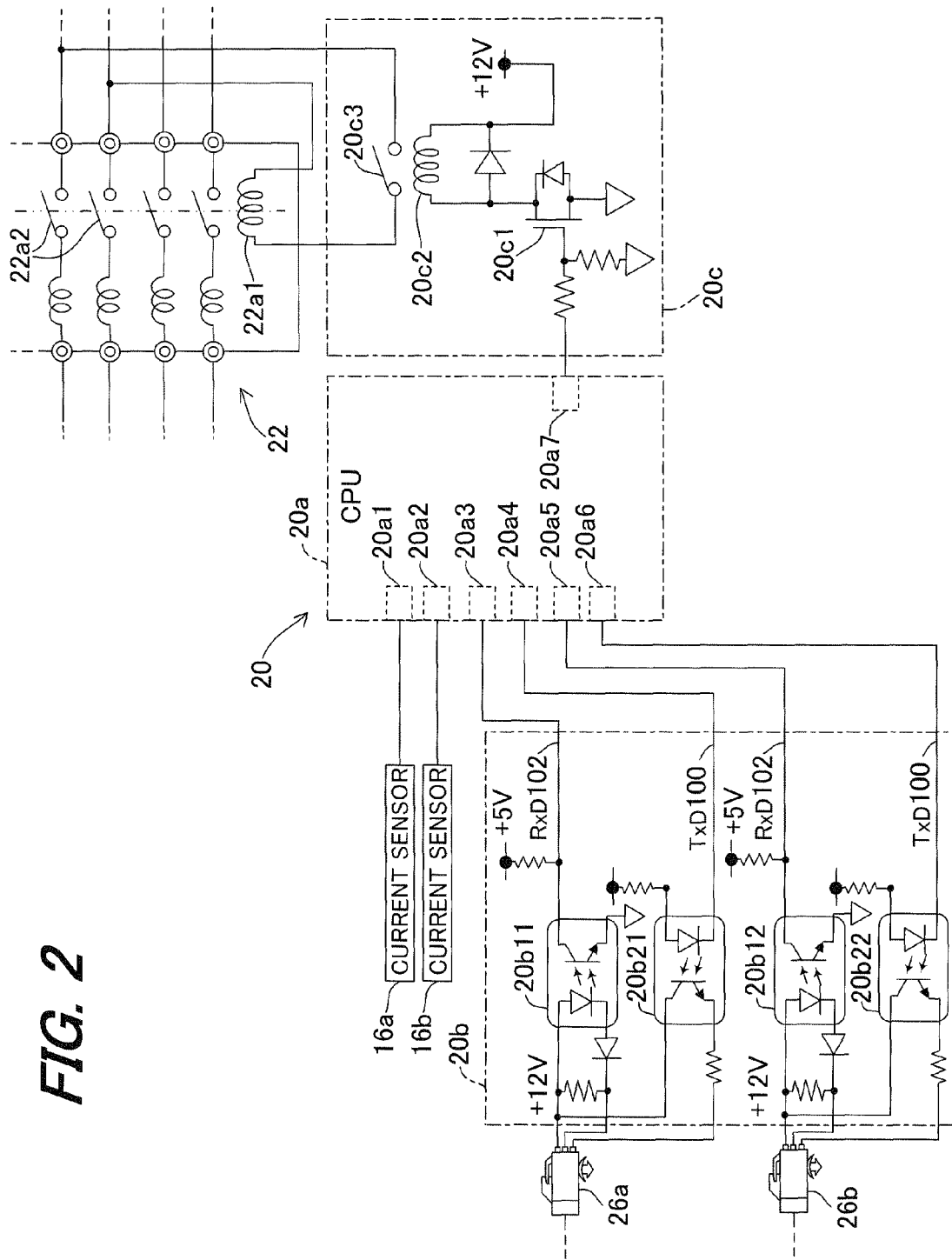
FIG. 2 is a block diagram showing the configuration of an ECU of the apparatus shown in FIG. 1.

FIG. 2 is a block diagram showing the configuration of the ECU 20.

As shown, the ECU 20 is equipped with a CPU 20a, a generator model identifier 20b, and a relay driver 20c.

The CPU 20a is equipped with input ports 20a1, 20a2 and 20a3, an output port 20a4, an input port 20a5, and output ports 20a6 and 20a7. The CPU 20a inputs the outputs of the current sensors 16a and 16b through the input ports 20a1 and 20a2.

The TxD terminals 100, RxD terminals 102, ground terminals 104 and power supply terminals 106 of the generators A and B are in connection with the model identifier 20b of the ECU 20 via the terminals 26.

The generator model identifier 20b is equipped with insulating photocouplers 20b11 (20b12) and 20b21 (20b22). When current passes from the power supply terminals 106 to the ground terminals 104 of the generators A and B, the light emitting diode of the photocoupler 20b11 (20b12) lights and the associated phototransistor conducts, so that the potential on the RxD terminal 102 falls from H to L level. Similarly, when the light emitting diode of the photocoupler 20b21 (20b22) is turned on by passage of current, the associated phototransistor conducts, so that the potential falls from H to L level.

The RxD terminals 102 and TxD terminals 100 are connected to the CPU 20a through the input port 20a3 (20a5) and the output port 20a4 (20a6). This configuration enables the CPU 20a of the ECU 20 to communicate with the ECUs 110 of the generators A and B through the TxD terminals 100 and RxD terminals 102.

The relay driver 20c is equipped with an FET 20c1. The gate of the FET 20c1 is connected to the output port 20a7 of the CPU 20a, the source is connected through a control coil 20c2 to a 12 V power source in the operating power circuit, and the drain is connected to ground.

When a negative voltage is outputted from the output port 20a7 of the CPU 20a, the FET 20c1 does not conduct and the control coil 20c2 is therefore demagnetized. As a result, a contact 20c3 remains closed so that the coil 22a1 connected to the high voltage wire 14a1 and neutral wire 14a3 is also demagnetized. Since the four contacts 22a2 therefore remain closed (relay OFF), the generators A and B remain connected to the electrical load 12 through the conductive path 14.

When a positive voltage is outputted from the output port 20a7 of the CPU 20a, the FET 20c1 conducts to magnetize the control coil 20c2 and coil 22a1. Since the four contacts 22a2 are therefore opened (relay ON), the generators A and B are prevented from connecting to the electrical load 12. The ECU 20 thus operates as a switching circuit operating means for opening and closing the switching circuit 22 in response to the output of the current sensors 16 and the result of a model ID discrimination explained later.

Figure 3:
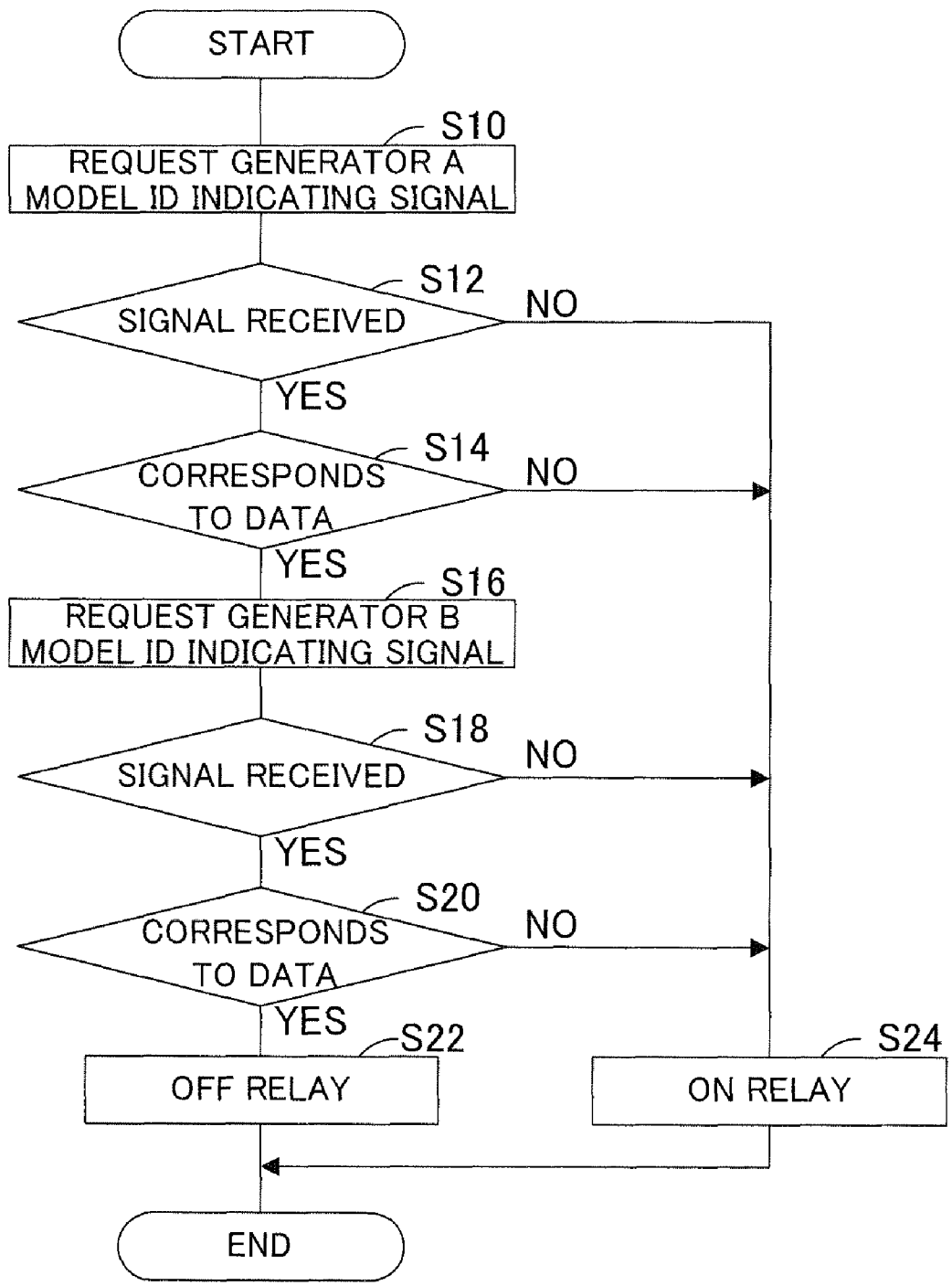
FIG. 3 is a flowchart showing the sequence of operations of the ECU shown in FIG. 2.
Figure 4A:
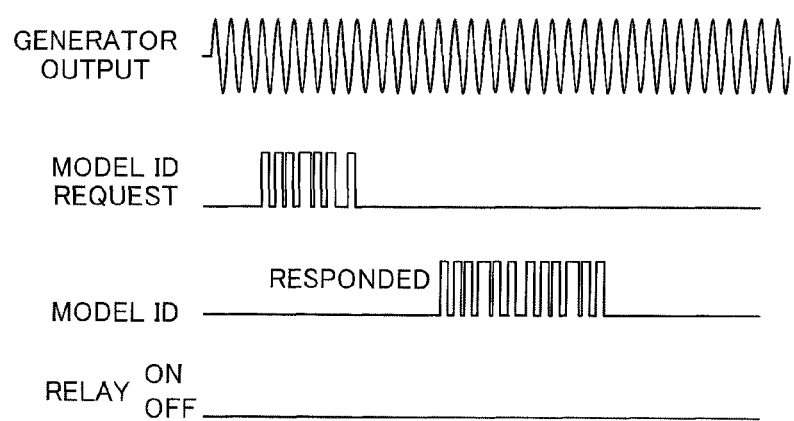
FIGS. 4A and 4B are a set of time charts for explaining the operations of FIG. 3.
Figure 4B:
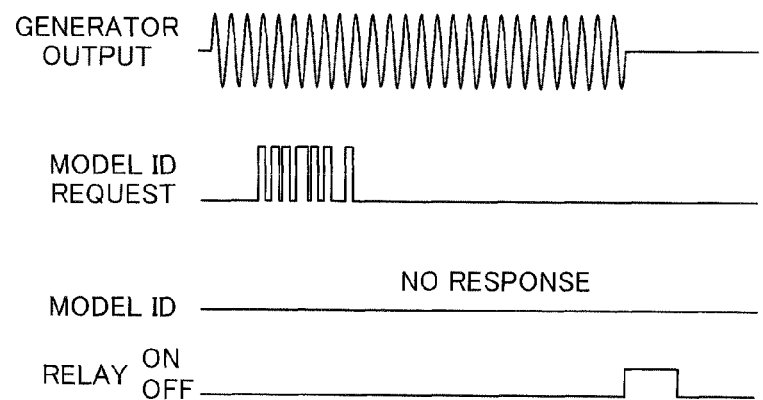

FIG. 3 is a flowchart showing the sequence of operations of the ECU 20 as a switching circuit operator. FIGS. 4A and 4B are time charts for explaining the operations.

After at least one of the generators A and B has been started by its recoil starter (or cell-starter) and is producing an output like that shown at the top of FIG. 4A (when the relay 22a is turned OFF), the program is started in S10, in which the ECU 20 communicates with the ECU 110a of the generator A through the signal line 24a and the TxD terminal 100a and requests the generator A a signal indicating its model ID.

The model ID is an identifier specifying the generator model. Every model has a different ID. As mentioned above, the generators A and B have identical outputs, so their model IDs are the same.

The program proceeds to S12, in which it is determined whether the signal indicating the model ID was received (inputted) via the RxD terminal 102a. When the result is YES, the program proceeds to S14, in which it is determined whether the model ID indicated by the received signal corresponds to data stored in memory (not shown) beforehand.

The generator B can of course be connected with the generator A because the two are the same model. The memory also stores the model IDs of generators differing in model from the generators A and B but connectable with either because their outputs are the same.

When the result in S14 is YES, the program proceeds to S16, in which, similarly to the foregoing, the ECU 20 communicates with the ECU 110b of the generator B through the signal line 24b and the TxD terminal 100b and requests the generator B a signal indicating its model ID.

The program next proceeds to S18, in which it is determined whether the signal indicating the model ID was received (inputted) via the RxD terminal 102b. When the result is YES, the program proceeds to S20, in which it is determined whether the model ID indicated by the received signal corresponds to data stored in memory beforehand.

When the result in S20 is YES, the program proceeds to S22, in which a negative voltage is outputted from the output port 20a7 (relay 22a OFF). That is, in view of the fact that the processing according to the flowchart of FIG. 3 begins with outputting a negative voltage from the output port 20a7 so as to demagnetize the relay 22a, the negative voltage output (relay 22a OFF) state is maintained.

When the result in any of S12, S14, S18 and S20 is NO, the program proceeds to S24, in which a positive voltage is outputted from the output port 20a7. As a result, the relay 22a is turned ON to open the conductive path 14 and prevent the generators A and B from connecting to the electrical load 12.

The apparatus 10 merges the outputs of the generators A and B and supplies the composite output through the output socket Oe to the electrical load 12. When the generators A and B are thus run in parallel, they are synchronously operated to have output voltages of the same magnitude, same frequency and same phase.

Considering the case where, in the course of this parallel running, one or the other of the plug Pa connected to the generator A through the output socket Oa and the plug Pb connected to the generator B through the output socket Ob accidentally comes out (is pulled out) of its socket, then where the detached plug is plug Pb, for example, there would be a risk of the output generated by the generator A appearing at the voltage terminals Pb1 and Pb2 of the plug Pb.

Figure 5:
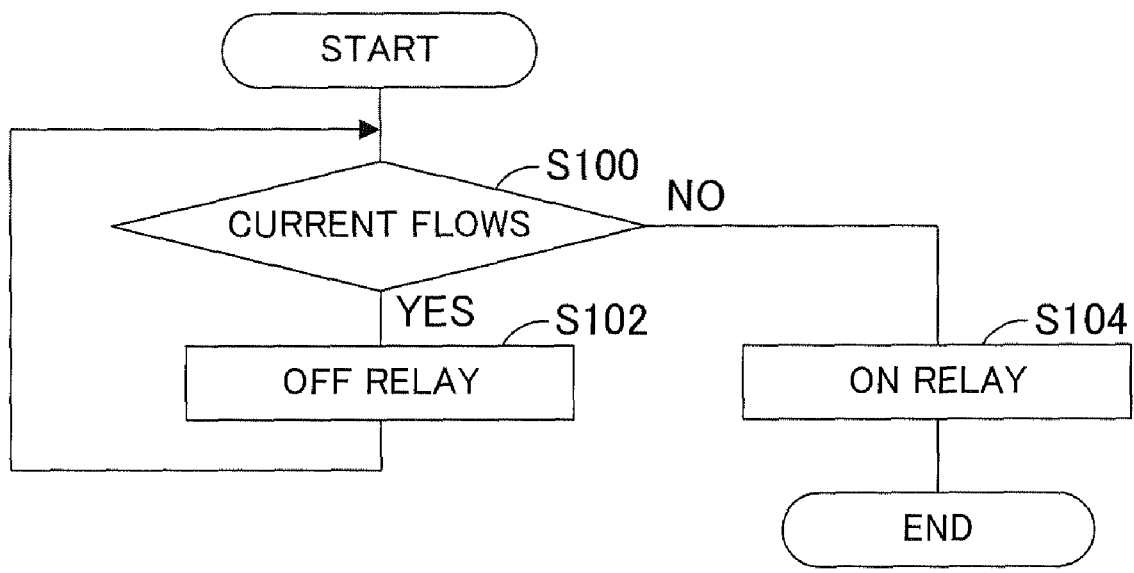
FIG. 5 is a flowchart showing the sequence of other operations of the ECU shown in FIG. 2.

FIG. 5 is a flowchart showing the sequence of plug detachment detection operations executed by the ECU 20 following the processing of FIG. 3.

The program begins in S100, in which it is determined whether current is flowing or passing from one of the plugs Pa and Pb to the other based on the outputs of the current sensors 16a and 16b. When the result is YES, the program proceeds to S102, in which the negative output (relay 22a OFF) state is maintained, and then returns to S100 to repeat the same check. When the result in S100 is NO, the program proceeds to S104, in which positive voltage is outputted from the output port 20a7 to turn the relay 22a ON, thereby opening the conductive path 14 and preventing the generators A and B from connecting to the electrical load 12.

Owing to the foregoing configuration, the connection apparatus for parallel running generators 10 according to this embodiment can, without need for dedicated parallel running sockets or the like, respond to disconnection of one of the plugs Pa and Pb to prevent the output of the other generator from appearing at the terminals of the disconnected plug, and further, by checking whether the model IDs of the generators A and B correspond to data stored in memory beforehand, can determine whether the generators are connectable, thereby protecting the generators from damage.

Moreover, the data stored in memory beforehand includes multiple model IDs and the generators A and B are connected to the electrical load 12 only when it is found that the model IDs indicated by the input signals correspond to model IDs among the multiple model IDs contained in the data. Owing to this configuration, the apparatus not only offers the foregoing advantages but further enables the determination as to whether generators are connection-compatible to be made still more reliably.

In addition, the connection terminals are configured in the manner of the TxD terminals 100 and RxD terminals 102 for troubleshooting the generators A and B. The apparatus therefore not only offers the foregoing advantages but further enables the determination as to whether generators are connection-compatible to be made simply without need for special connection terminals.

As stated above, the embodiment is configured to have an apparatus (10) for connecting generators (A, B) to run in parallel, comprising: a conductive path (14) that is adapted to connect the generators to an electrical load (12); a switching circuit (22) that opens/closes the conductive path; a current sensor (16) that detects current flowing the conductive path; and an electronic control unit (20) that comprises a microcomputer and functions as: a generator model identifier (S10 to S20) that inputs a signal indicating a model ID from each of the generators and determines whether the model ID of the inputted signal corresponds to data stored in memory; and a switching circuit operator (S22, S24, S100 to S104) that operates the switching circuit (22) to close the conductive path (14) to connect the generators (A, B) to the electrical load (12) when the model ID of the inputted signal corresponds to the data, while operates it (22) to open the conductive path (14) when the current is not detected by the current sensor after the conductive path was closed.

In the apparatus, the data stored in memory includes data for a plurality of model IDs, and the switching circuit operator closes the conductive path when the model ID of the inputted signal corresponds to one of the data (S12 to S22).

In the apparatus, the generator model identifier inputs the signal through a terminal for troubleshooting or remote control (100, 102).

In the apparatus, the generators (A, B) are two.

It should be noted that, in the foregoing embodiment, although the explanation is made on the case where the two generators A, B are run or operated in parallel, this invention can be applied to the parallel running of three or more interconnected generators.

Japanese Patent Application No. 2008-164371 filed on Jun. 24, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for connecting generators to run in parallel, comprising:
- a conductive path that is adapted to connect the generators to an electrical load;
- a switching circuit that opens/closes the conductive path;
- a current sensor that detects current flowing the conductive path; and
- an electronic control unit that comprises a microcomputer and functions as:
- a generator model identifier that inputs a signal indicating a model ID from each of the generators and determines whether the model ID of the inputted signal corresponds to data stored in memory; and
- a switching circuit operator that operates the switching circuit to close the conductive path to connect the generators to the electrical load when the model ID of the inputted signal corresponds to the data, while operates it to open the conductive path when the current is not detected by the current sensor after the conductive path was closed.

2. The apparatus according to claim 1, wherein the data stored in memory includes data for a plurality of model IDs, and the switching circuit operator closes the conductive path when the model ID of the inputted signal corresponds to one of the data.

3. The apparatus according to claim 1, wherein the generator model identifier inputs the signal through a terminal for troubleshooting or remote control.

4. The apparatus according to claim 1, wherein the generators are two.

* * * * *